United States Patent
Takamura et al.

(10) Patent No.: US 9,785,372 B2
(45) Date of Patent: Oct. 10, 2017

(54) STORAGE DEVICE AND METHOD FOR CONFIGURING RAID GROUP

(71) Applicant: Hitachi, Ltd., Chiyoda-ku, Tokyo (JP)

(72) Inventors: Yukiyoshi Takamura, Tokyo (JP); Tomohisa Ogasawara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/769,559

(22) PCT Filed: May 17, 2013

(86) PCT No.: PCT/JP2013/063759
§ 371 (c)(1),
(2) Date: Aug. 21, 2015

(87) PCT Pub. No.: WO2014/184943
PCT Pub. Date: Nov. 20, 2014

(65) Prior Publication Data
US 2015/0378637 A1 Dec. 31, 2015

(51) Int. Cl.
*G06F 3/06* (2006.01)

(52) U.S. Cl.
CPC .......... *G06F 3/0632* (2013.01); *G06F 3/0604* (2013.01); *G06F 3/0605* (2013.01); *G06F 3/0631* (2013.01); *G06F 3/0689* (2013.01)

(58) Field of Classification Search
CPC .... G06F 3/0632; G06F 3/0604; G06F 3/0605; G06F 3/0631; G06F 3/0689
See application file for complete search history.

(56) References Cited

U.S. PATENT DOCUMENTS

| | | | |
|---|---|---|---|
| 2005/0010620 A1* | 1/2005 | Silvers | G06F 3/0605 |
| 2007/0192560 A1 | 8/2007 | Furuhashi | |
| 2007/0233952 A1* | 10/2007 | Tanaka | G06F 3/0605 711/114 |

FOREIGN PATENT DOCUMENTS

| | | |
|---|---|---|
| EP | 1 811 392 A1 | 7/2007 |
| JP | 2007-213448 A | 8/2007 |
| JP | 2007-526528 A | 9/2007 |
| JP | 2007-323557 A | 12/2007 |

(Continued)

OTHER PUBLICATIONS

PCT International Search Report and Written Opinion on application PCT/JP2013/063759 dated Aug. 6, 2013; 7 pages.

*Primary Examiner* — Eric S Cardwell
(74) *Attorney, Agent, or Firm* — Foley & Lardner LLP

(57) ABSTRACT

A storage subsystem capable of satisfying conditions such as storage capacity and access performance requested by users and to enable expansion of storage drives that are not in RAID group (RG) units is provided at a low cost. The storage subsystem includes a first storage drive for storing data sent from a host computer, a second storage drive having a property that differs from the first storage drive for storing data sent from the host computer, and a processor for controlling the first storage drive and the second storage drive, wherein a processor receives RG configuration requirements from the host computer and determines whether an RG satisfying the RG configuration requirements can be configured, and if the processor determines that an RG can be configured, the first storage drive and the second storage drive are combined to configure the RG.

2 Claims, 18 Drawing Sheets

(56) References Cited

FOREIGN PATENT DOCUMENTS

WO    WO 2005/001682 A2    1/2005
WO    WO 2006/038286 A1    4/2006

* cited by examiner

Fig. 5

| RG# 501 | Emulation Type 511 | User Specified Information | | | | Capacity Required per Single Drive Dave (GB) 503 | Performance Allocated to RG (IOPS) 504 | Serial # 505 | Drive Allocation Start Location (Logical block) 506 |
|---|---|---|---|---|---|---|---|---|---|
| | | Number of Expanded Drives N (Drives) 512 | Maximum Number of Drives Nmax (Drives) 513 514 | Total Capacity of RG Cmax (GB) 515 | RG Performance P (IOPS) 502 | | | | |
| 1 | 2D2D | 4 | 4 | 1,000 | 400 | 250 | 667 | A1 | 0 |
| | | | | | | | | A2 | 0 |
| | | | | | | | | A3 | 0 |
| | | | | | | | | A4 | 0 |
| 2 | 2D2D | 4 | 4 | 600 | 15,000 | 150 | 18,900 | B1 | 0 |
| | | | | | | | | B2 | 0 |
| | | | | | | | | B3 | 0 |
| | | | | | | | | C1 | 0 |
| 3 | 7D1P | 8 | 8 | 3,200 | 200,000 | 400 | 300,000 | C2 | 0 |
| | | | | | | | | C3 | 0 |
| | | | | | | | | C4 | 0 |
| | | | | | | | | C5 | 0 |
| | | | | | | | | D1 | 0 |
| | | | | | | | | D2 | 0 |
| | | | | | | | | D3 | 0 |
| | | | | | | | | D4 | 0 |
| 4 | 6D2P | 7 | 8 | 2,400 | 1,400 | 300 | 1,300 | A5 | 0 |
| | | | | | | | | A6 | 0 |
| | | | | | | | | A7 | 0 |
| | | | | | | | | A8 | 0 |
| | | | | | | | | A9 | 0 |
| | | | | | | | | A10 | 0 |
| | | | | | | | | B4 | 0 |

Fig. 6

| Serial # | Basic / Expansion | Drive Information ||||||| SAS I/F Path | Power Supply Path | Occurrence of Failure in the Past Day | Expansion Target Drive |
| | | Drive Type | Maximum Capacity (1) (GB) | Allocated Capacity (2) (GB) | Free Capacity (3)=(1)-(2) (GB) | Maximum Performance (4) (IOPS) | Allocated Performance (5)=(2)/(1)x(4) (IOPS) | Free Performance (6)=(4)-(5) (IOPS) | | | | |
|---|---|---|---|---|---|---|---|---|---|---|---|---|
| A1 | Basic | SAS | 300 | 250 | 50 | 200 | 167 | 33 | Path 1 | Path 1 | 0 | |
| A2 | Basic | SAS | 300 | 250 | 50 | 200 | 167 | 33 | Path 2 | Path 2 | 0 | |
| A3 | Basic | SAS | 300 | 250 | 50 | 200 | 167 | 33 | Path 3 | Path 3 | 0 | |
| A4 | Basic | SAS | 300 | 250 | 50 | 200 | 167 | 33 | Path 4 | Path 4 | 1 | |
| B1 | Basic | SAS | 600 | 150 | 450 | 200 | 50 | 150 | Path 1 | Path 1 | 0 | |
| B2 | Basic | SAS | 600 | 150 | 450 | 200 | 50 | 150 | Path 2 | Path 2 | 0 | |
| B3 | Basic | SAS | 600 | 150 | 450 | 200 | 50 | 150 | Path 3 | Path 3 | 0 | |
| C1 | Basic | SSD | 400 | 150 | 250 | 50,000 | 18,750 | 31,250 | Path 4 | Path 4 | 0 | |
| C2 | Basic | SSD | 400 | 400 | 0 | 50,000 | 50,000 | 0 | Path 1 | Path 1 | 1 | |
| C3 | Basic | SSD | 400 | 400 | 0 | 50,000 | 50,000 | 0 | Path 2 | Path 2 | 0 | |
| C4 | Basic | SSD | 400 | 400 | 0 | 50,000 | 50,000 | 0 | Path 3 | Path 3 | 0 | |
| C5 | Basic | SSD | 400 | 400 | 0 | 50,000 | 50,000 | 0 | Path 4 | Path 4 | 0 | |
| D1 | Basic | SSD | 800 | 400 | 400 | 50,000 | 25,000 | 25,000 | Path 5 | Path 5 | 0 | |
| D2 | Basic | SSD | 800 | 400 | 400 | 50,000 | 25,000 | 25,000 | Path 6 | Path 6 | 0 | |
| D3 | Basic | SSD | 800 | 400 | 400 | 50,000 | 25,000 | 25,000 | Path 7 | Path 7 | 0 | |
| D4 | Basic | SSD | 800 | 400 | 400 | 50,000 | 25,000 | 25,000 | Path 8 | Path 8 | 0 | |
| A5 | Basic | SAS | 300 | 300 | 0 | 200 | 200 | 0 | Path 1 | Path 1 | 0 | * |
| A6 | Basic | SAS | 300 | 300 | 0 | 200 | 200 | 0 | Path 2 | Path 2 | 0 | * |
| A7 | Basic | SAS | 300 | 300 | 0 | 200 | 200 | 0 | Path 3 | Path 3 | 0 | * |
| A8 | Basic | SAS | 300 | 300 | 0 | 200 | 200 | 0 | Path 4 | Path 4 | 0 | * |
| A9 | Basic | SAS | 300 | 300 | 0 | 200 | 200 | 0 | Path 5 | Path 5 | 0 | * |
| A10 | Basic | SAS | 300 | 300 | 0 | 200 | 200 | 0 | Path 6 | Path 6 | 0 | * |
| B4 | Basic | SAS | 600 | 300 | 300 | 200 | 100 | 100 | Path 7 | Path 7 | 0 | |

Fig. 7

| Serial # | Basic / Expansion | Drive Information ||||||| SAS I/F Path | Power Supply Path | Occurrence of Failure in the Past Day | Expansion Target Drive |
| | | Maximum Capacity (GB) | Allocated Capacity (GB) | Free Capacity (GB) | Maximum Performance (IOPS) | Allocated Performance (IOPS) | Free Performance (IOPS) | | | | |
| --- | --- | --- | --- | --- | --- | --- | --- | --- | --- | --- | --- |
| B1 | Basic | 600 | 150 | 450 | 200 | 50 | 150 | Path 1 | Path 1 | 0 | |
| B2 | Basic | 600 | 150 | 450 | 200 | 50 | 150 | Path 2 | Path 2 | 0 | |
| B3 | Basic | 600 | 150 | 450 | 200 | 50 | 150 | Path 3 | Path 3 | 0 | |
| C1 | Basic | 400 | 150 | 250 | 50,000 | 18,750 | 31,250 | Path 4 | Path 4 | 0 | |
| B4 | Basic | 600 | 300 | 300 | 200 | 100 | 100 | Path 7 | Path 7 | 0 | * |
| D1 | Basic | 800 | 400 | 400 | 50,000 | 25,000 | 25,000 | Path 5 | Path 5 | 0 | |
| D2 | Basic | 800 | 400 | 400 | 50,000 | 25,000 | 25,000 | Path 6 | Path 6 | 0 | |
| D3 | Basic | 800 | 400 | 400 | 50,000 | 25,000 | 25,000 | Path 7 | Path 7 | 0 | |
| D4 | Basic | 800 | 400 | 400 | 50,000 | 25,000 | 25,000 | Path 8 | Path 8 | 0 | |

Fig. 8

| Priority Order | Selection Condition |
|---|---|
| 1 | Drive having higher speed (Performance) |
| 2 | Drive having lower frequency of failure (Reliability) |
| 3 | Drive having different I/F path (Redundancy) |
| 4 | Drive having different power supply path (Redundancy) |
| 5 | Drive not used by other RG (Performance) |
| 6 | Drive having lower speed and satisfying user specified performance (Performance) |
| 7 | Single physical drive allocatable as multiple drives to single RG (Case 2) |

| Priority Order | Selection Condition |
|---|---|
| 1 | Drive having higher speed (Performance) |
| 2 | Drive having lower frequency of failure (Reliability) |
| 3 | Drive having different I/F path (Redundancy) |
| 4 | Drive having different power supply path (Redundancy) |
| 5 | Drive not used by other RG (Performance) |
| 6 | Drive having lower speed and satisfying user specified performance (Performance) |

Fig. 16

User Specified Information / Drive Information

| RG# | Emu-lation | Nmax (UNIT) | Cmax (GB) | P (IOPS) | Dave (GB) | Low load thresh-old (IOPS) | High load thresh-old (IOPS) | Measured RG load (IOPS) | Serial # | Basic/Ex-pan-sion | Copy source | Drive Type | Max (GB) | Allo-cated (GB) | Lo-cation | Free (GB) | Max (IOPS) | Allo-cated (IOPS) | Free (IOPS) | SAS Path | Power Supply Path | Fail-ure |
|---|---|---|---|---|---|---|---|---|---|---|---|---|---|---|---|---|---|---|---|---|---|---|
| 1 | 2D2D | 4 | 1000 | 400 | 250 | 200 | 533 | 150 → 800 | A1 | Basic | | SAS | 300 | 250 | 0 | 50 | 200 | 167 | 33 | Path1 | Path1 | 2 |
| | | | | | | | | | A2 | Basic | | SAS | 300 | 250 | 0 | 50 | 200 | 167 | 33 | Path2 | Path2 | 2 |
| | | | | | | | | | A3 | Basic | | SAS | 300 | 250 | 0 | 50 | 200 | 167 | 33 | Path3 | Path3 | 1 |
| | | | | | | | | | A4 | Basic | | SAS | 300 | 250 | 0 | 50 | 200 | 167 | 33 | Path4 | Path4 | 0 |
| 2 | 2D2D | 4 | 600 | 50,000 | 150 | 25,000 | 80,000 | 14,000 | B1 | Basic | | SSD | 400 | 150 | 0 | 250 | 50,000 | 18,750 | 31,250 | Path1 | Path1 | 0 |
| | | | | | | | | | B2 | Basic | | SSD | 400 | 150 | 0 | 250 | 50,000 | 18,750 | 31,250 | Path2 | Path2 | 1 |
| | | | | | | | | | B3 | Basic | | SSD | 400 | 150 | 0 | 250 | 50,000 | 18,750 | 31,250 | Path3 | Path3 | 2 |
| | | | | | | | | | B4 | Basic | | SSD | 400 | 150 | 0 | 250 | 50,000 | 18,750 | 31,250 | Path4 | Path2 | 2 |

⇩ Copy data from A4 drive to B1 drive

| RG# | Emu-lation | Nmax (UNIT) | Cmax (GB) | P (IOPS) | Dave (GB) | Low load thresh-old (IOPS) | High load thresh-old (IOPS) | Measured RG load (IOPS) | Serial # | Basic/Ex-pan-sion | Copy source | Drive Type | Max (GB) | Allo-cated (GB) | Lo-cation | Free (GB) | Max (IOPS) | Allo-cated (IOPS) | Free (IOPS) | SAS Path | Power Supply Path | Fail-ure |
|---|---|---|---|---|---|---|---|---|---|---|---|---|---|---|---|---|---|---|---|---|---|---|
| 1 | 2D2D | 4 | 1000 | 400 | 250 | 200 | 25,400 | 800 → 30,000 | A1 | Basic | | SAS | 300 | 250 | 0 | 50 | 200 | 167 | 33 | Path1 | Path1 | 2 |
| | | | | | | | | | A2 | Basic | | SAS | 300 | 250 | 0 | 50 | 200 | 167 | 33 | Path2 | Path2 | 2 |
| | | | | | | | | | A3 | Basic | | SAS | 300 | 250 | 0 | 50 | 200 | 167 | 33 | Path3 | Path3 | 1 |
| | | | | | | | | | A4 | Basic | | SAS | 300 | 0 | F4CE | 50 | 200 | 0 | 33 | Path4 | Path4 | 0 |
| | | | | | | | | | B1 | Exp | A4 | SSD | 400 | 250 | 0 | 0 | 50,000 | 31,250 | 0 | Path1 | Path1 | 0 |
| 2 | 2D2D | 4 | 600 | 50,000 | 150 | 25,000 | 80,000 | 14,000 | B1 | Basic | | SSD | 400 | 150 | 0 | 0 | 50,000 | 18,750 | 0 | Path1 | Path1 | 0 |
| | | | | | | | | | B2 | Basic | | SSD | 400 | 150 | 0 | 250 | 50,000 | 18,750 | 31,250 | Path2 | Path2 | 1 |

⇩ Copy data from A3 drive to B2 drive

Fig. 17

User Specified Information / Drive Information (before copy-back)

| RG# | Emulation | Nmax (UNIT) | Cmax (GB) | P (IOPS) | Dave (GB) | Low load threshold (IOPS) | High load threshold (IOPS) | Measured RG load (IOPS) | Serial # | Basic/Expansion | Copy source | Drive Type | Max (GB) | Allocated (GB) | Location | Free (GB) | Max (IOPS) | Allocated (IOPS) | Free (IOPS) | SAS Path | Power Supply Path | Failure |
|---|---|---|---|---|---|---|---|---|---|---|---|---|---|---|---|---|---|---|---|---|---|---|
| 1 | 2D2D | 4 | 1000 | 400 | 250 | 200 | 50,267 | 30,000 → 180 | A1 | Basic |  | SAS | 300 | 250 | 0 | 50 | 200 | 167 | 33 | Path1 | Path1 | 2 |
|  |  |  |  |  |  |  |  |  | A2 | Basic |  | SAS | 300 | 250 | 0 | 50 | 200 | 167 | 33 | Path2 | Path2 | 2 |
|  |  |  |  |  |  |  |  |  | A3 | Basic |  | SAS | 300 | 0 | 0 | 50 | 200 | 0 | 33 | Path3 | Path3 | 1 |
|  |  |  |  |  |  |  |  |  | A4 | Basic |  | SAS | 300 | 0 | 0 | 50 | 200 | 0 | 33 | Path4 | Path4 | 0 |
|  |  |  |  |  |  |  |  |  | B1 | Exp | A4 | SSD | 400 | 250 | F4CE | 0 | 50,000 | 31,250 | 0 | Path1 | Path1 | 0 |
|  |  |  |  |  |  |  |  |  | B2 | Exp | A3 | SSD | 400 | 250 | F4CE | 0 | 50,000 | 31,250 | 0 | Path2 | Path2 | 1 |
| 2 | 2D2D | 4 | 600 | 50,000 | 150 | 25,000 | 80,000 | 14,000 | B1 | Basic |  | SSD | 400 | 150 | 0 | 250 | 50,000 | 18,750 | 0 | Path1 | Path1 | 0 |
|  |  |  |  |  |  |  |  |  | B2 | Basic |  | SSD | 400 | 150 | 0 | 250 | 50,000 | 18,750 | 0 | Path2 | Path2 | 1 |

Copy-back from B2 drive to A3 drive
Copy-back from B1 drive to A4 drive

User Specified Information / Drive Information (after copy-back)

| RG# | Emulation | Nmax (UNIT) | Cmax (GB) | P (IOPS) | Dave (GB) | Low load threshold (IOPS) | High load threshold (IOPS) | Measured RG load (IOPS) | Serial # | Basic/Expansion | Copy source | Drive Type | Max (GB) | Allocated (GB) | Location | Free (GB) | Max (IOPS) | Allocated (IOPS) | Free (IOPS) | SAS Path | Power Supply Path | Failure |
|---|---|---|---|---|---|---|---|---|---|---|---|---|---|---|---|---|---|---|---|---|---|---|
| 1 | 2D2D | 4 | 1000 | 400 | 250 | 200 | 533 | 180 | A1 | Basic |  | SAS | 300 | 250 | 0 | 50 | 200 | 167 | 33 | Path1 | Path1 | 2 |
|  |  |  |  |  |  |  |  |  | A2 | Basic |  | SAS | 300 | 250 | 0 | 50 | 200 | 167 | 33 | Path2 | Path2 | 2 |
|  |  |  |  |  |  |  |  |  | A3 | Basic |  | SAS | 300 | 250 | 0 | 50 | 200 | 167 | 33 | Path3 | Path3 | 1 |
|  |  |  |  |  |  |  |  |  | A4 | Basic |  | SAS | 300 | 250 | 0 | 50 | 200 | 167 | 33 | Path4 | Path4 | 0 |
|  |  |  |  |  |  |  |  |  | B1 | Basic |  | SSD | 400 | 150 | 0 | 250 | 50,000 | 18,750 | 31,250 | Path1 | Path1 | 0 |
|  |  |  |  |  |  |  |  |  | B2 | Basic |  | SSD | 400 | 150 | 0 | 250 | 50,000 | 18,750 | 31,250 | Path2 | Path2 | 1 |
| 2 | 2D2D | 4 | 600 | 50,000 | 150 | 25,000 | 80,000 | 14,000 |  |  |  |  |  |  |  |  |  |  |  |  |  |  |

STORAGE DEVICE AND METHOD FOR CONFIGURING RAID GROUP

TECHNICAL FIELD

The present invention relates to a storage subsystem, and a method for configuring RAID groups.

BACKGROUND ART

Recently, along with the explosive increase of the amount of information and data handled by companies and government offices, the amount of processed data or the capacity of stored data in large-scale computers such as host computers, servers, and storage subsystems coupled to the host computers have also increased significantly. Especially, unlike the severs or other information processing systems, storage subsystems are devices specialized in storing data, which utilize a large number of HDDs (Hard Disk Drives) as data storage media having large capacity and high reliability, which are managed and operated via a RAID (Redundant Array of Independent (Inexpensive) Disks) configuration.

Patent Literature 1 discloses an art related to the RAID system. Patent Literature 1 discloses dividing a logical volume composed of RAID groups formed of the same type of storage drives (hereinafter referred to as drives) into pools, and managing the same. It is a common technical knowledge that a RAID group is composed of the same type of drives, as taught in Patent Literature 1.

CITATION LIST

Patent Literature

[PTL 1]
Japanese Patent Application Laid-Open Publication No. 2007-213448 (U.S. Patent Application Publication No. 2007/0192560)

SUMMARY OF INVENTION

Technical Problem

The main types of drives used in storage subsystems are an HDD and an SSD (Solid State Drive). The volume of shipments of SSDs is only approximately 3% of the whole volume, but is currently spreading. The SSD has a higher performance (approximately 250 times) than the HDD, but the bit cost is higher (approximately 10 times) than the HDD, so that the needs of users requesting a storage subsystem utilizing inexpensive and high-capacity HDDs compared to the high performance SSDs are still high.

There exists storage subsystems using RAID groups (hereinafter referred to as RG) composed only of SSDs and RGs composed only of HDDs in combination. However, such storage subsystem includes only two types of RGs, an RG composed of SSDs having high performance, small capacity and requires higher costs, and an RG composed of HDDs having low performance, large capacity and requires lower costs, so that it is not possible to provide an RG having an intermediate storage capacity or access performance even if such RG is requested by the user. If it is possible to have a single storage drive expanded at a time, and to form the RAID of a mixture of different types of storage drives, various merits can be achieved, such as enabling the response performance to the RG to be varied in a stepwise manner in response to the ratio of the respective types of storage drives, the costs thereof to be controlled in a stepwise manner, and excessive storage drives to be utilized effectively. However, if expansion of storage drives not in RG units is permitted, problems may occur, such as the RAID composed of only the expanded storage drives incapable of satisfying user requirements such as capacity and performance, or the redundancy not being ensured.

Therefore, the present invention aims at providing at a low cost a storage subsystem capable of satisfying requirements such as storage capacity and access performance requested by the user while enabling storage drives which are not in RG units to be expanded.

Solution to Problem

In order to solve the problems mentioned above, the storage subsystem according to the present invention includes a first storage drive coupled to a host computer and storing data from the host computer, a second storage drive having a different characteristic as the first storage drive and storing data from the host computer, and a processor for controlling the first storage drive and the second storage drive, wherein the processor receives an RG configuration requirement from the host computer to determine whether an RG satisfying the RG configuration requirement can be configured, and if it is determined that the RG can be configured, the first storage drive and the second storage drive are used in a mixture to configure the RG.

Further, the type of the drive or the physical device configuring the RG is varied based on the status of load of the RG.

Advantageous Effects of Invention

According to the storage subsystem of the present invention, the response performance with respect to the RG can be controlled in a stepwise manner according to the rate of the respective types of drives configuring the RG, and the cost thereof can also be adjusted in a stepwise manner. In addition, the drive having an excessive access performance or storage capacity can be used for another RG, so that an effect of utilizing the physical resources of the storage subsystem effectively can be realized. These and other problems, configurations and effects of the present invention will become apparent from the following description of preferred embodiments.

BRIEF DESCRIPTION OF DRAWINGS

FIG. 5 is a view showing a configuration example of an RG configuration management table.

FIG. 6 is a view showing a configuration example of a drive management table.

FIG. 7 is a view showing a configuration example of an allocatable drive management table.

FIG. 8 is a view showing a first configuration example of a priority order management table.

FIG. 16 is a view showing a configuration example of an RG status management table.

FIG. 17 is a view showing a configuration example of an RG status management table.

DESCRIPTION OF EMBODIMENTS

Figure 1:
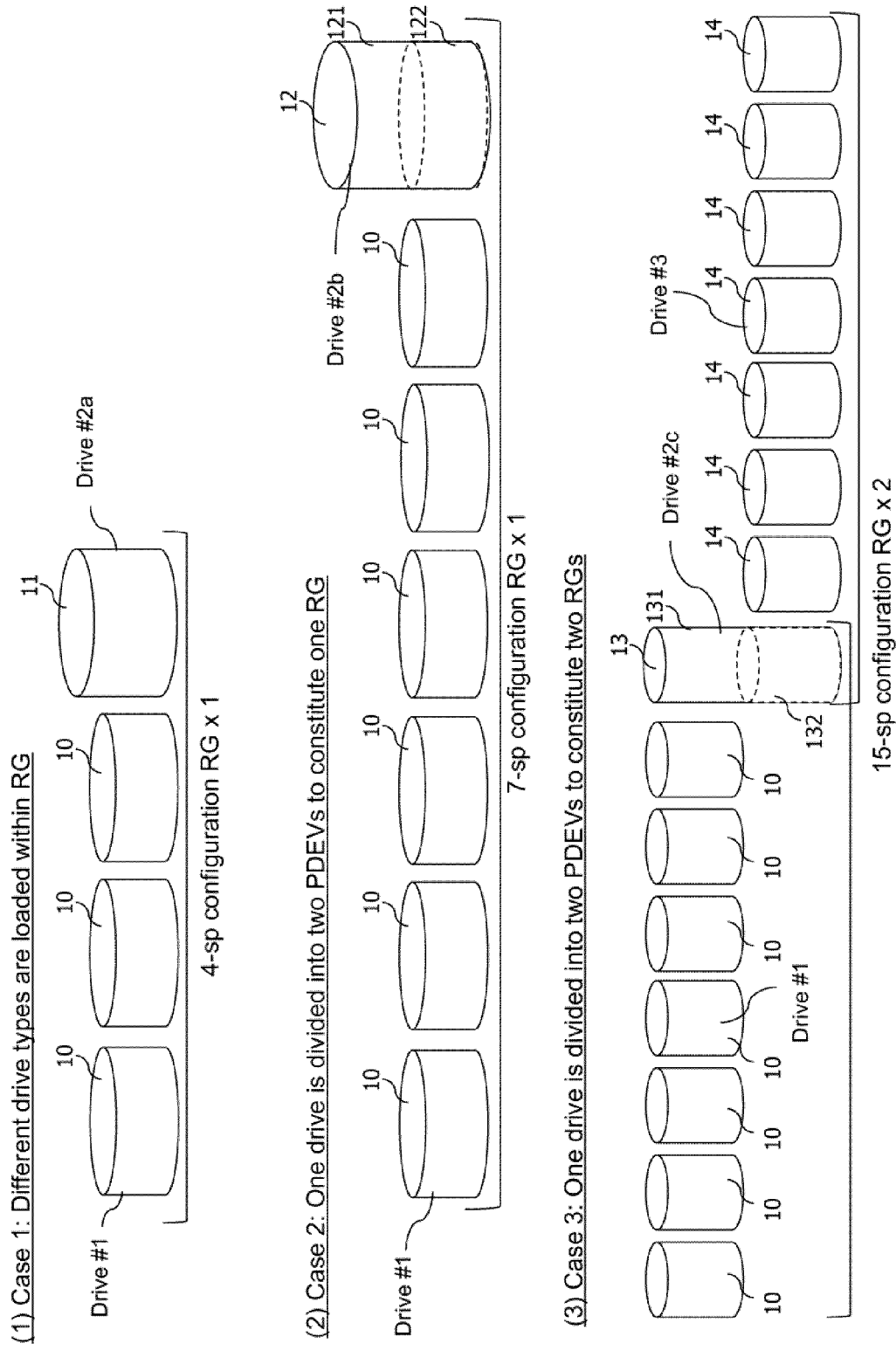
FIG. 1 is a view showing a first concept of the present invention.

Now, the preferred embodiments of the present invention will be described with reference to the drawings. In the following description, various information may be referred to for example as "aaa table", but the various information can also be expressed by data structures other than tables. Further, the "aaa table" can also be referred to as "aaa information" to indicate that the information does not depend on the data structure.

The processes are sometimes described using the term "program" as the subject. The program is executed by a processor such as an MP (Micro Processor) or a CPU (Central Processing Unit) for performing determined processes. A processor can also be the subject of the processes since the processes are performed using appropriate storage resources (such as memories) and communication interface devices (such as communication ports). The processor can also use dedicated hardware in addition to the CPU. The computer program can be installed to each computer from a program source. The program source can be provided via a program distribution server or a storage media, for example.

Each element, such as each controller, can be identified via numbers, but other types of identification information such as names can be used as long as they are identifiable information. The equivalent elements are denoted with the same reference numbers in the drawings and the description of the present invention, but the present invention is not restricted to the present embodiments, and other modified examples in conformity with the idea of the present invention are included in the technical scope of the present invention. The number of each component can be one or more than one unless defined otherwise.

Embodiment 1

<Concept of Invention>

FIG. 1 illustrates a first concept of the present invention. The present invention aims at solving the problems caused by allowing expansion of storage drives that are not in RG units, such as not being able to satisfy user requirements including capacity and performance, or not being able to ensure redundancy, by forming a RAID configuration using only the expanded storage drives. Therefore, the case illustrated in FIG. 1 (1) is a first case for carrying out the present invention, where different drives (drive #1 10 and drive #2a 11) are loaded within the RG. In the case of FIG. 1 (1), three drives #1 10 and one drive #2a 11 are used to constitute an RG, such as RAID 1 adopting a 2D+2D configuration or RAID 5 adopting a 3D+1P configuration.

The aforementioned HDD can be classified into detailed drive types including an FC (Fiber Channel)—HDD, a SAS (Serial Attached SCSI)—HDD, and a SATA (Serial Advanced Technology Attachment)—HDD, wherein the SAS-HDD can be further classified into a normal type and a NL (Near Line) type. The access property, the storage capacity and other properties differ among the various types of HDDs. The storage capacity of the FC-HDD and the SAS-HDD is approximately between 300 and 600 HB (Giga Bytes), while on the other hand, the capacity of SATA-HDD is approximately between 3 and 6 TB (Tera Bytes). The access property is higher in the SAS-HDD and the FC-HDD than in the SATA-HDD. In the case of FIG. 1 (1), for example, SAS-HDD is used as the drive #1 10 and the SSD is used as the drive #2a 11, so that different types of drives are used to constitute the RG.

For example, a single HDD is partitioned into given storage capacities via logical partitions, and the number of drives is thereby changed. According to this logical "partition", the drive can be virtually handled as two or more drives. The present invention focuses on this viewpoint to compose the RGs illustrated in FIG. 1(2) or FIG. 1(3).

FIG. 1(2) illustrates a second case for carrying out the present invention, wherein out of the seven drives, a specific drive (drive #2b 12) is divided into two physical drives (PDEVs) 121 and 122. In the illustrated case, PDEV 121 and PDEV 122 are used as a single independent drive, and a total of eight drives are formed to constitute a single RG (such as RAID 5 adopting a 7D+1P configuration or RAID 6 adopting a 6D+2P configuration).

In the case of FIG. 1(2), for example, a single RG is composed by having drive #1 10 formed of SAS-HDDs and drive #2b 12 formed of SSDs. It is also possible to compose drive #1 10 and drive #2 12 of the same type of SAS-HDDs.

An RG having a 7D+1P configuration or the like can be formed using six drives. In such case, one of the six drives is divided into three PDEVs to provide eight drives, which are used to compose a single RG. It is also possible to divide two out of the six drives into two PDEVs respectively, to provide eight drives to constitute a single RG.

FIG. 1(3) illustrates a third case for carrying out the present invention, wherein one drive out of 15 drives is divided into two PDEVs to constitute two RGs. In the case of FIG. 1(3), at first, drive #2c 13 is divided into two PDEVs, PDEV 131 and PDEV 132. Then, seven drives #1 10 and PDEV 131 are used to constitute one RG, and seven drives #3 14 and PDEV 132 are used to constitute another RG.

Also according to the third case, similar to the second case, a single drive can be divided into three or more PDEVs to constitute an RG, or multiple drives can be divided into two or more PDEVs, respectively, to constitute an RG.

Figure 2:
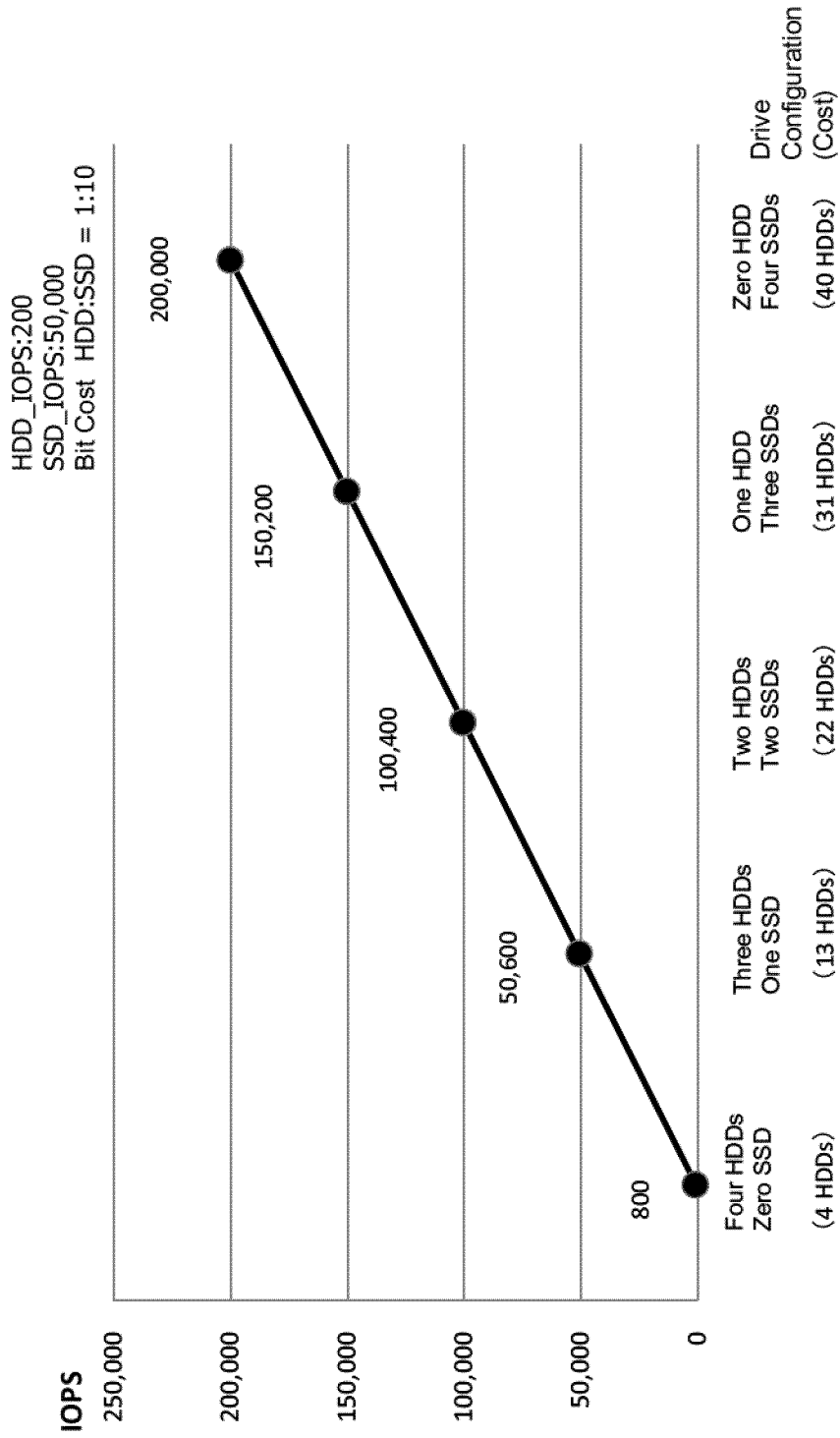
FIG. 2 is a view showing an effect according to a first concept of the present invention.

FIG. 2 is a view showing an effect according to the first concept of the present invention. FIG. 2 illustrates a random read performance of various combinations of drive types used to constitute an RG, with the performance of the HDD set to 100 IOPS (I/O Per Second) and the performance of the SSD having the same storage capacity (hereinafter referred to as capacity) as the HDD set to 50,000 IOPS.

The total bandwidth of the case where a backend of a storage subsystem is 6 Gbps (Giga bit per second) and the controller coupled to the drives is a wide link (×4) is 24 Gbps. Since there are four links, the access performance can be improved in proportion to the number of drives being loaded, if the number of drives is four or smaller. Further, if there are five or more drives being coupled, the performance can be enhanced up to the aforementioned band boundary by parallelizing the I/O access requests to other drives while waiting for a response from the drive.

In other words, as shown in FIG. 2, the access performance of the RG composed of four HDDs (hereinafter referred to as performance) is 800 IOPS. Further, the performance of the RG composed of a combination of three HDDs+one SSD will be 50,600 IOPS (=200×3+50,000×1). Similarly, the performance of the combination of two HDDs+two SSDs will be 100,400 IOPS, the performance of the combination of one HDD+three SSDs will be 150,200 IOPS, and the performance of four SSDs will be 200,000 IOPS. In other words, when the performance of four HDDs is assumed to be 1, the performance can be improved in a stepwise manner to approximately 63 times, 125 times, 188 times and 250 times the original performance.

On the other hand, from viewpoint of cost, when the bit cost is HDD:SSD=1:10, the cost of three HDD+one SSD configuration corresponds to 13 HDDs, the cost of two HDD+two SSD configuration corresponds to 22 HDDs, the cost of one HDD+three SSD configuration corresponds to 31 HDDs, and the cost of four SSD configuration corresponds to 40 HDDs. If the cost of a four HDD configuration is assumed to be 1, the replacement of HDD by SSD causes the cost to be increased in a stepwise manner to approximately three times, six times, eight times and 10 times the original cost, which is increased in a gentler slope compared to the increase of the access performance.

As described, by enabling expansion of one storage drive at a time and by composing a RAID configuration by combining different types of storage drives, various advantages can be achieved, such as enabling to change the response performance in a stepwise manner with respect to RGs in response to the rate of the various types of drives being used, adjust the costs in a stepwise manner, and effectively utilize the excessive storage drives. Thus, a storage subsystem capable of satisfying the needs and requirements of users can be composed at a low cost by determining the most suitable combination of drives for constituting the RG considering the performance required by the user and the costs and capacities regarding the performance.

<Storage System>

Figure 3:
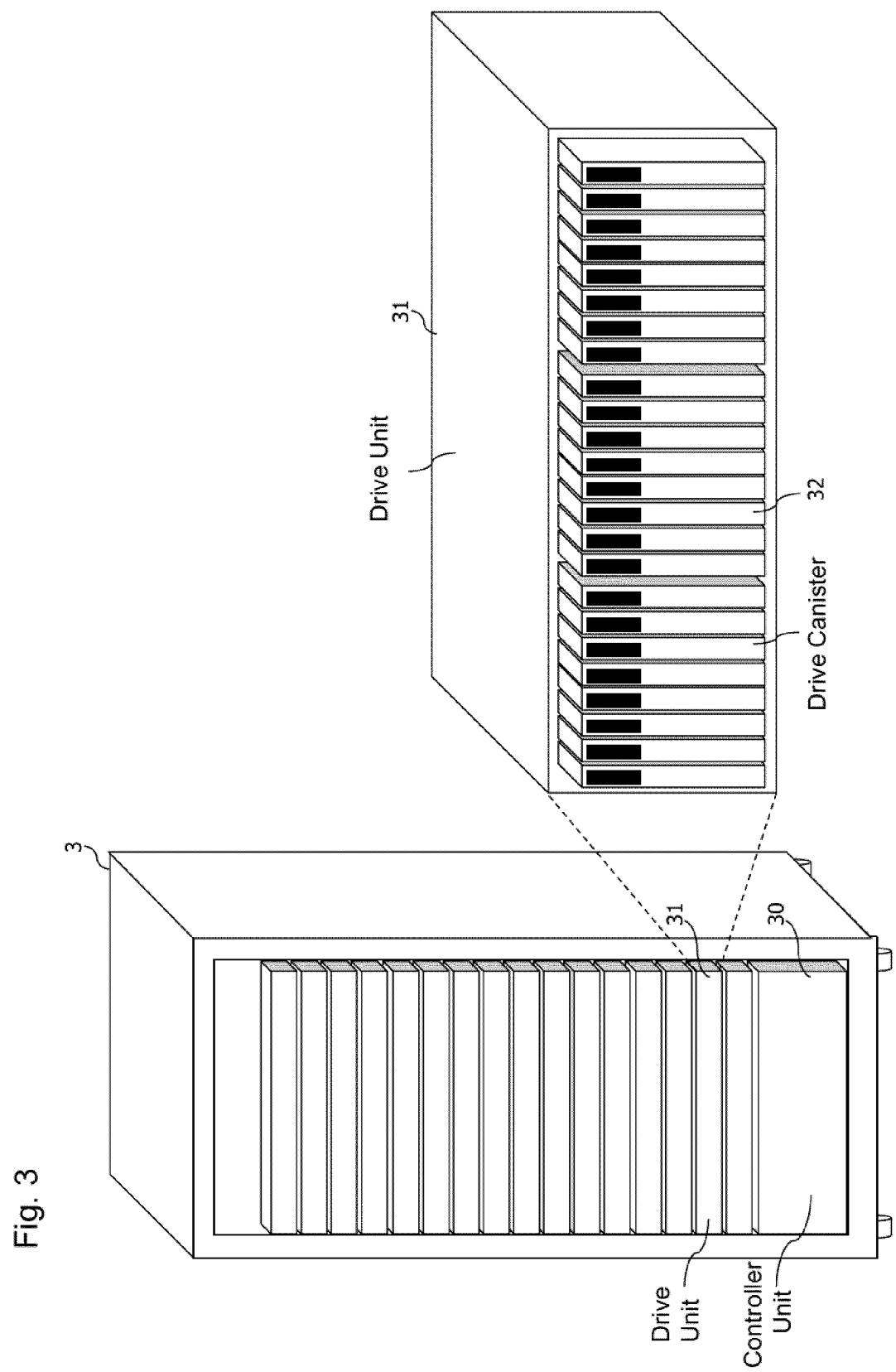
FIG. 3 is a view showing an outer appearance of a storage subsystem according to the present invention.

FIG. 3 is a view showing an outer appearance of a storage subsystem according to the present invention. A storage subsystem 3 is composed of one or more controller units 30 and multiple drive units 31. Each drive unit 31 is formed to enable insertion of multiple drive canisters 32 having HDDs and SSDs built therein.

Figure 4:
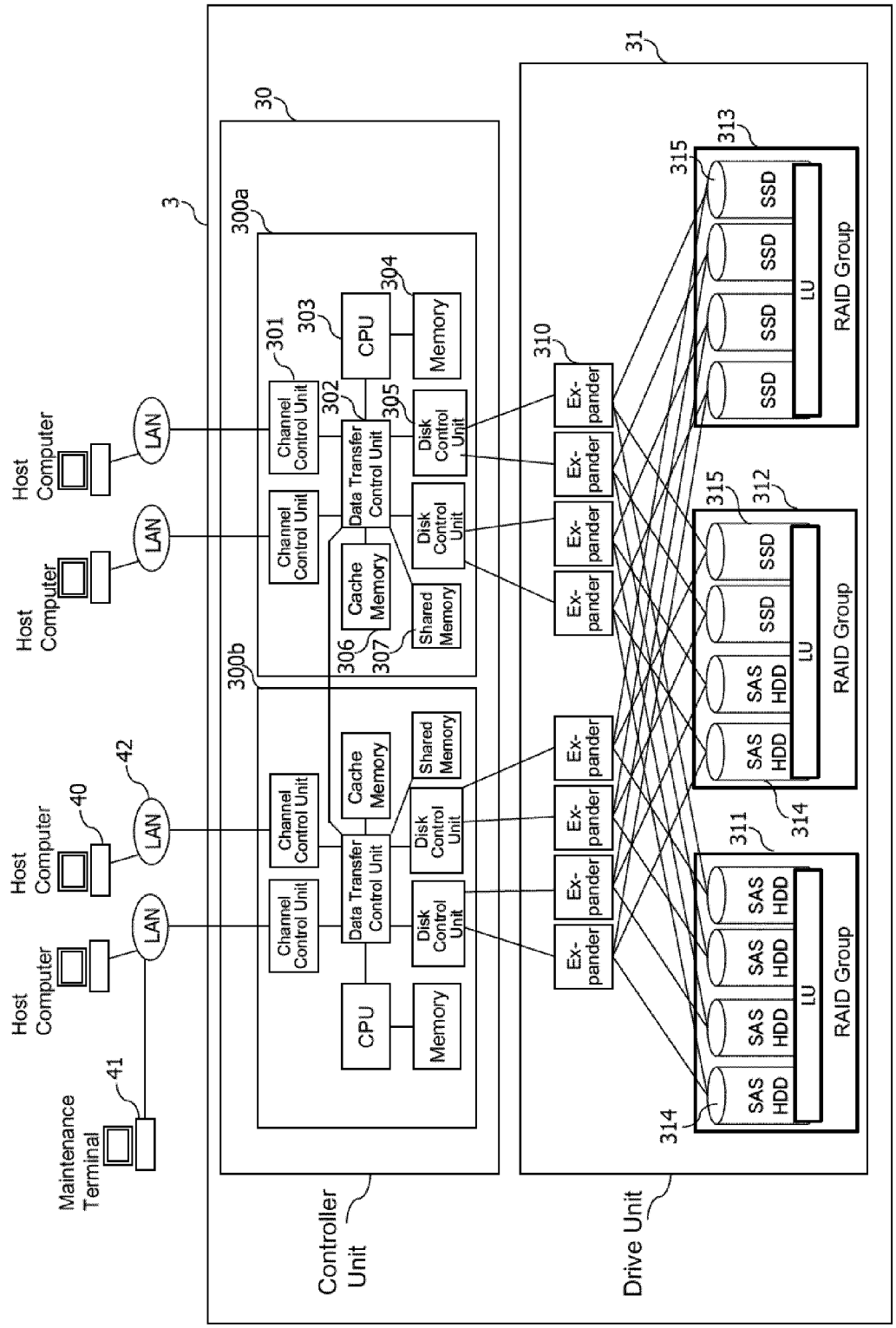
FIG. 4 is a hardware block diagram showing a storage system equipped with the storage subsystem according to the present invention.

FIG. 4 is a hardware block diagram showing the storage system including the storage subsystem according to the present invention. The storage system comprises a storage subsystem 3, host computers 40, a maintenance terminal 41, and a LAN (Local Area Network) 42 mutually connecting the same.

Although not shown, each host computer 40 comprises a CPU for controlling the whole computer, a memory for storing control information and user data, an HBA (Host Bus Adaptor) for communicating with the storage subsystem 3, an output device for displaying various tables described later or configuration information of the storage subsystem 3, and an input device for receiving setup information or the like from the user. The host computer 40 sends and receives access commands and user data to/from the storage subsystem 3 via the HBA.

Although not shown, the maintenance terminal 41 comprises a CPU, a memory, an output device for displaying the operation status of the storage subsystem 3 or the like, and an input device for receiving setup information or the like from a system administrator.

The storage subsystem 3 comprises a controller unit 30 and a drive unit 31. The controller unit 30 is equipped with two microprocessor packages (MPPKs) 300a/300b for realizing redundancy, so that the reliability of the system is improved. Each MPPK 300a/300b includes a channel control unit 301, a data transfer control unit 302, a CPU 303, a memory 304, a disk control unit 305, a cache memory 306, and a shared memory 307.

The channel control unit 301 is a controller for sending and receiving user data and user setup information (such as a user specified information for the RG configuration described later) to/from the host computer 40. The data transfer control unit 302 is a controller for transferring data and commands among the CPU 303, the respective control units and the respective memories. The CPU 303 is a processor for controlling the whole storage subsystem 3. The memory 304 stores various programs executed via the CPU 303 and various tables.

The disk control unit 305 is a controller for sending and receiving data to/from the storage drive of the drive unit 31. The cache memory 306 is a memory for temporarily storing the user data from the host computer 40 or the drive unit 31, or the control information of the storage subsystem 3. The shared memory 307 is a memory for storing control information and the like used in a shared manner among the various processors and controllers.

The drive unit 31 comprises multiple expanders 310 for connecting a number of drives exceeding the number of drives set by standard. Further, the expanders 310 couple the SAS-HDDs 314 or SSDs 315 loaded in the drive unit 31 with the disk control units 305. As according to the prior art, four SAS-HDDs 314 constitute RG 311, and four SSDs 315 constitute RG 313. Further, as a characteristic feature of the present invention, different types of drives SAS-HDDs 314 and SSDs 315 are combined to constitute RG 312.

<Tables>
<RG Configuration Management Table>

FIG. 5 is a view showing a configuration example of an RG configuration management table. The RG configuration management table 50 is a table for managing information necessary for composing an RG, and comprises an RG #501, a user specified information 502, a capacity required per single drive Dave 503, a performance allocated to RG (IOPS) 504, a serial #505, and a drive allocation start location (start logical block number) 506.

The RG #501 is a number for uniquely identifying RGs. The user specified information 502 includes information required to constitute the RG received by the storage subsystem 3 from the host computer 40, an emulation type 511, a number of expanded drives N (drives) 512, a maximum number of drives Nmax (drives) 513 of the RG, a total capacity Cmax (GB) 514 of the RG, and an RG performance P (IOPS) 515. The emulation type 511 shows the information representing the RAID type constituting the RG, wherein "2D2D" represents RAID 1 having a 2D+2D configuration, "7D1P" represents RAID 5 having a 7D+1P configuration, and "6D2P" represents RAID 6 having a 6D+2P configuration.

The number of expanded drives N (drives) 512 represents the number of drives that the user considers necessary to be expanded, that is, the number of drives actually inserted to the storage subsystem. The maximum number of drives Nmax (drives) 513 of the RG represents the number of drives required to constitute the RG, wherein the number is 4 if the emulation type 511 is "2D2D" and the number if 8 if the emulation type 511 is either "7D1P" or "6D2P".

The capacity required per single drive Dave 503 is the average capacity of drives constituting the RG, which is a value calculated by dividing the total capacity of RG Cmax (GB) 514 by the maximum number of drives Nmax (drives) 513 of the RG. The performance allocated to the RG (IOPS) 504 is the performance achieved by allocating the drives designated in the serial #505.

The serial #505 is identification information for uniquely identifying the drives. The drive allocation start location 506 is information showing from which logical block of the drive designated in the serial #505 the allocation of the storage area to the RG designated via the RG #501 is started. For example, if the drive #2b 12 of FIG. 1 (2) has logical blocks starting from address 0 H (H represents Hexadecimal) to address 0xFFFFFFFF H, since PDEV 121 and PDEV 122 have the same capacity, the drive allocation start location 506 will be 0 H and 0x80000000 H, respectively.

<Drive Management Table>

FIG. 6 is a view showing a configuration example of a drive management table. The drive management table 60 is a table for managing the status of allocation of each drive, a path information of SAS I/F and power supplies, and failure information. The drive management table 60 is composed of a serial #505, a basic/expansion 601, a drive information 602, a SAS I/F path information 603, a power supply path information 604, a number of failures occurred in the past day 605, and an expansion target drive 606.

The basic/expansion 601 shows the information on whether the drive shown by the serial #501 is used as a single piece (basic) or whether the drive is used by dividing into two or more PDEVs (expansion).

The drive information 602 includes a drive type information 610, a maximum capacity of drive (1) 611, an allocated capacity to RG (2) 612, a free capacity allocatable to RG (3) 613, a drive maximum performance (4) 614, an allocated performance to RG (5) 615, and a free performance allocatable to RG (6) 616.

The free capacity (3) 613 is calculated by subtracting the allocated capacity (2) 612 from the maximum capacity (1) 611. The allocated performance (5) 615 is calculated by multiplying the maximum performance (4) 614 by the ratio of the allocated capacity (2) 612 to the maximum capacity (1) 611. The free performance (6) 616 is calculated by subtracting the allocated performance (5) 615 from the maximum performance (4) 614.

The SAS I/F path information 603 is information showing which path had been selected from the connection paths between the drive and the disk control unit 305. The power supply path information 604 is information showing which path had been selected from the connection paths between the drive and the power supply unit (not shown).

The number of failures occurred in the past day 605 is information for managing the average number of failures that had occurred in the past day. The expansion target drive 606 is information for uniquely identifying the drives constituting the RGs.

<Allocatable Drive Management Table>

FIG. 7 is a view showing a configuration example of an allocatable drive management table. The allocatable drive management table 70 is a table for managing the drives allocatable to other RGs as PDEVs. The allocatable drive management table 70 is a table created by executing a sorting process of allocatable drives described later based on the aforementioned drive management table 60.

Basically, the drives having the free capacity 613 and the free performance 616 required in an RG are extracted via the sorting process of allocatable drives. For example, if the free capacity required for allocation (free capacity 613) is 300 GB and the required performance (free performance 616) is 100 IOPS, the drives satisfying such conditions whose serial #505 are from B1 to B4, C1, and D1 to D4 are extracted.

The drive in which the serial #505 is "B4" having the capacity and performance closest to the required capacity and performance in the extracted drives is set as the expansion target drive (an "*" mark is entered in reference 606). The "B4" drive is added to the entry of the RG configuration management table 50 where the RG #501 is "4". Actually, the same value "B4" is entered under the row where the serial #505 is "B4", and for example, a value "0x1CA7F4CE" is entered in the drive allocation start location (start logical block number) 506. Then, the drive information of the drive in which the serial #505 is "B4" in the drive management table 60 is updated. In the present example, the allocated capacity (2) 612 is updated to 600 GB, the allocatable free capacity (3) 613 is updated to 0 GB, the allocated performance (5) 615 is updated to 200 IOPS, and the allocatable free performance (6) 616 is updated to 0 IOPS.

According to the above operation, it becomes possible to realize the RG configuration of case 2 (FIG. 1 (2)), that is, an RG composed of six SAS-HDDs having a capacity of 300 GB and one SAS-HDD having a capacity of 600 GB and having an emulation type 511 of "6D2P". Similarly, in the RG having an RG #501 set to "2", it becomes possible to realize the RG configuration of case 1 (FIG. 1 (1)) using three 600-GB SAS-HDDs and one 400-GB SSD. Of course, the RG can be composed of a SAS-HDD with a capacity of 300 GB, as shown in RG #501 "1".

<Priority Order Management Table 1>

FIG. 8 is a view showing a first configuration example of a priority order management table. The priority order management table 80 is a table for managing the priority conditions for allocating allocatable drives to RGs. The priority order management table 80 includes a priority order 801 and a selection condition 802. In the selection condition 802, the selection conditions are set up from the viewpoints of performance/reliability/redundancy/PDEV number, and so on.

<RG Configuration Processing During Drive Expansion>

Figure 9:
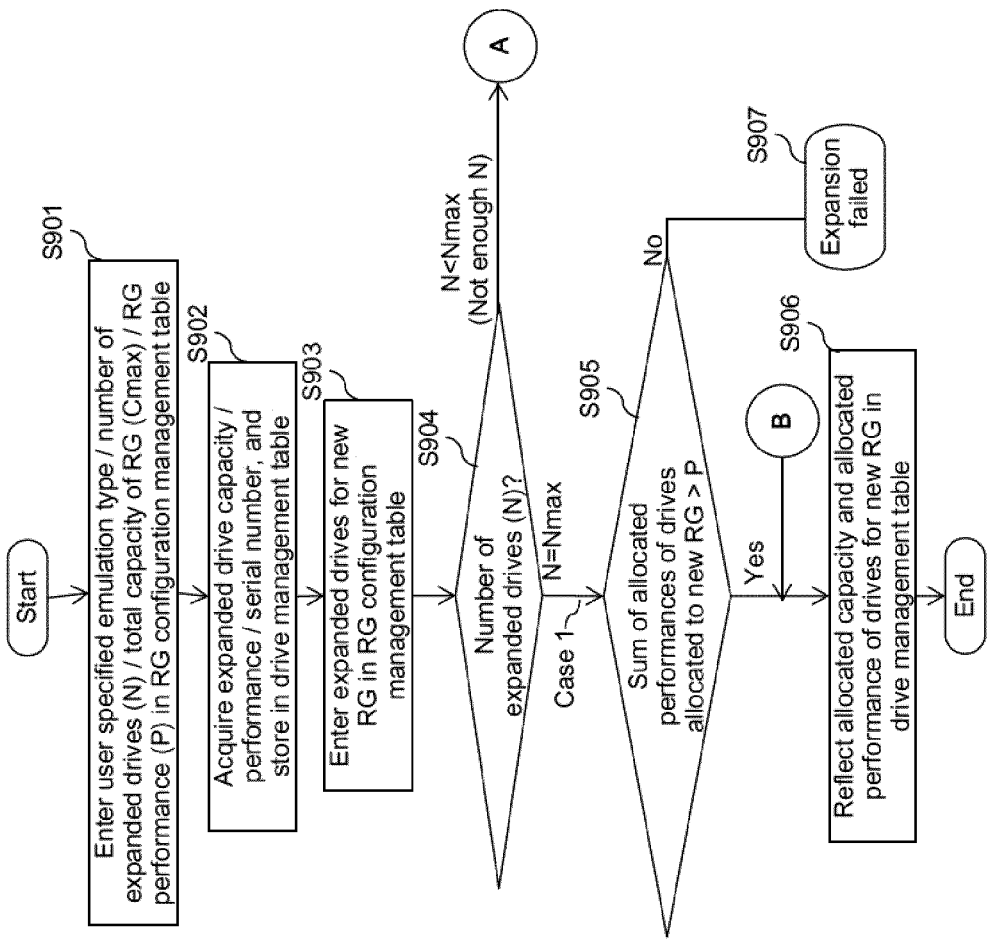
FIG. 9 is a flowchart showing an RG configuration processing during drive expansion.
Figure 10:
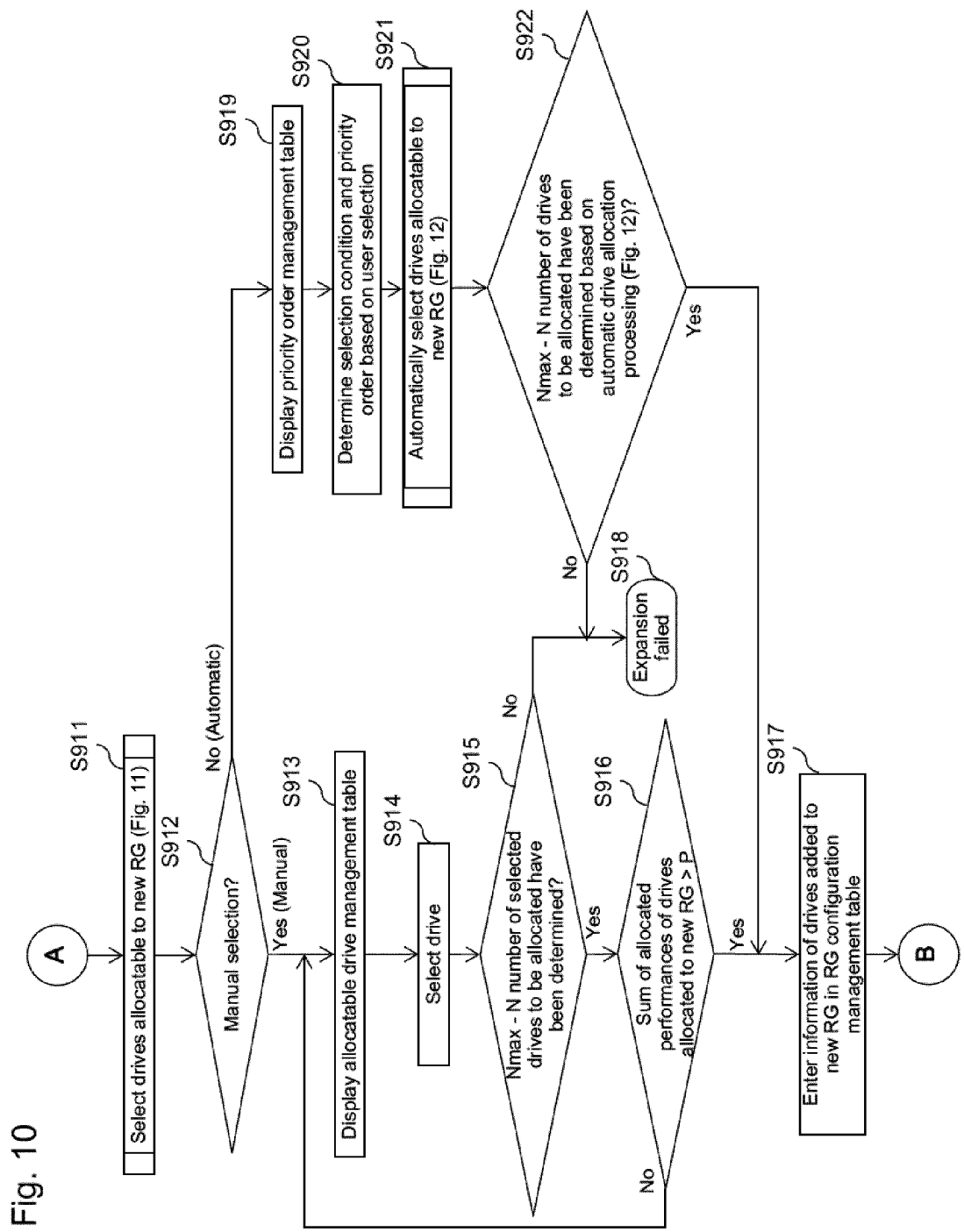
FIG. 10 is a flowchart showing an RG configuration processing during drive expansion.

FIGS. 9 and 10 are flowcharts illustrating an RG configuration processing during expansion of drives. The CPU 303 is illustrated as the subject of the processing, but other controllers or control programs (microprograms) can also be the subject.

The host computer 40 receives the user specified information including the emulation type 511, the number of drives to be expanded (N) 512, the total capacity of the RG (Cmax) 514 and the RG performance (P) 515 entered by the user, and transmits the same to the storage subsystem 3. The CPU 303 of the storage subsystem 3 enters the user specified information received by the host computer 40 to the RG configuration management table 50 (S901).

In S902, the CPU 303 acquires the capacity/performance/serial number of the drives being expanded, and enters the same in the drive management table 60.

In S903, the CPU 303 enters the expanded drives for the newly composed RG (hereinafter referred to as new RG) in the RG configuration management table 50. The corresponding drives in this example are the seven drives having a serial #505 of "A5" to "A10" and "B4" having "*" marks entered in the expansion target drive 606.

In S904, the CPU 303 determines whether the number of expanded drives (N) 512 is equal to the maximum number of drives of RG (Nmax) 513 or smaller. If N is smaller than Nmax, the CPU 303 executes the processes of S911 and thereafter. Case 2 and case 3 of FIG. 1 corresponds to this case. If N is equal to Nmax, the CPU executes the processes of S905 and thereafter. Case 1 of FIG. 1 corresponds to this case.

In S905, the CPU 303 determines whether a sum 504 of allocated performances of the drives allocated to the new RG is greater than the RG performance (P) 515 or not. If the sum is smaller (No), the CPU 303 sends a notice that expansion has failed to the host computer 40 of the user (S907).

In S906, the CPU 303 reflects the allocated capacity 612 and the allocated performance 615 of drives to the new RG in the drive management table 60.

Figure 11:
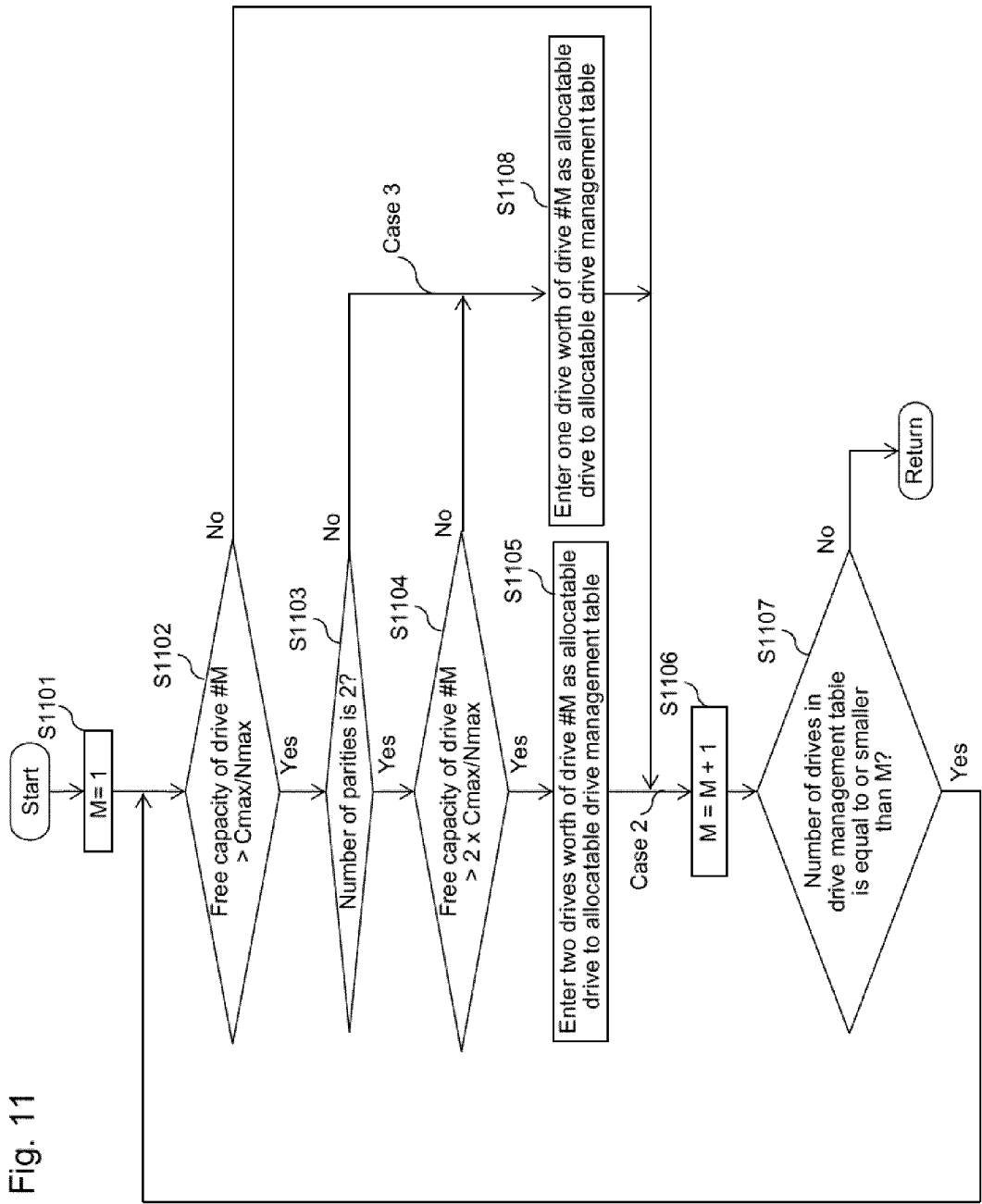
FIG. 11 is a flowchart showing a sorting process of allocatable drives.

In S911, the CPU 303 extracts drives allocatable to the new RG via a sorting process of allocatable drives illustrated in FIG. 11.

In S912, the CPU 303 determines whether the selection of drives actually allocated out of the extracted allocatable drive candidates is performed manually or automatically. If the selection is performed manually (Yes), the CPU 303 executes the processes of S913 and thereafter, and if the selection is performed automatically (No), the CPU 303 executes the processes of S919 and thereafter.

In S913, the CPU 303 displays the allocatable drive management table 70 on the host computer 40.

In S914, the CPU 303 receives the information of the drives selected by the user.

In S915, the CPU 303 determines whether Nmax−N number of drives to be allocated to the new RG have been determined. If the drives have not been determined (No), the CPU 303 outputs notice to the host computer 40 of the user that expansion of drives has failed (S918).

If Nmax−N number of drives to be allocated to the new RG have been determined, the CPU 303 determines whether the sum 504 of allocated performances of the drives allocated to the new RG is greater than the RG performance (P) 515 or not. If it is smaller (No), the CPU 303 re-executes the processes of S913 and thereafter.

In S917, the CPU 303 enters the information of the drives being added to the new RG in the RG configuration management table 50.

In S919, the CPU 303 displays the priority order management table 80 on the host computer 40. The user determines the selection condition 802 and the priority order 801 based on the priority order management table 80.

For example, in order to achieve high performance, the condition in which the priority order 801 is "1" corresponding to "drive having higher speed (performance)" is selected. Further, in order to select a type that has a performance close to the performance designated by the user, a condition having a priority order 801 of "6" is selected, and the priority order 801 can be set high, for example to "2". In order to place emphasis on maintaining fault tolerance (redundancy), the priority order is changed so that a drive is selected having a different I/F path with the priority order 801 of "3" or having a different power path with the priority order of "4". As described, an appropriate allocation drive can be selected by changing the contents of the priority order management table 80 according to the conditions required by the user.

In S920, the CPU 303 receives the determined selection condition 802 and the priority order 801.

Figure 12:
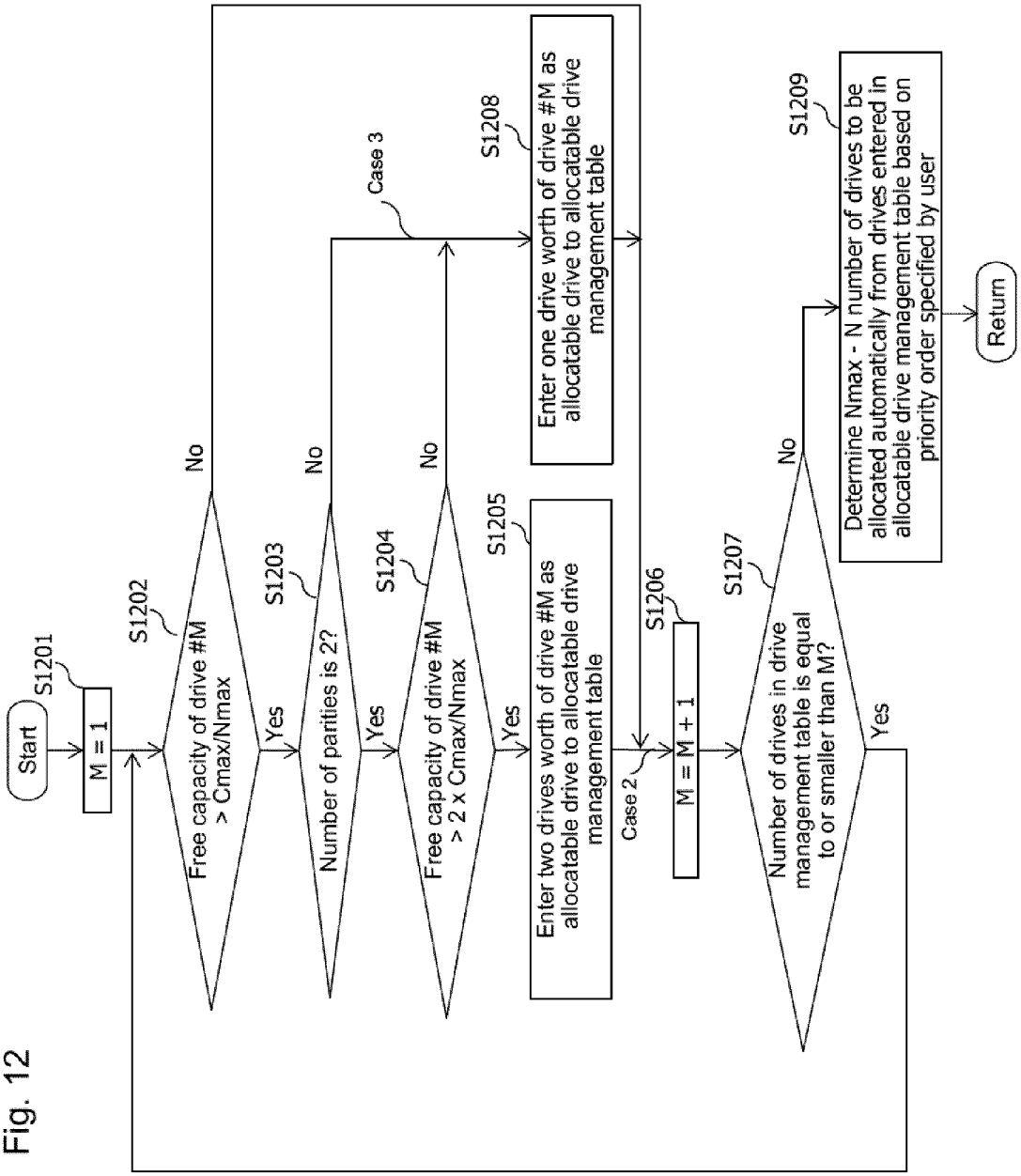
FIG. 12 is a flowchart showing an automatic drive allocation processing.

In S921, the CPU 303 determines the drives allocatable to the new RG via an automatic drive allocation processing illustrated in FIG. 12.

In S922, the CPU 303 determines whether Nmax−N number of drives to be allocated to the new RG have been determined or not. If Nmax−N number of drives have not been determined (No), the CPU 303 sends a notice notifying that the expansion has failed to the host computer 40 of the user (S918). If the drives had been determined (Yes), the CPU 303 enters the information on drives to be added to the new RG in the RG configuration management table 50.

<Sorting Process of Allocatable Drives>

FIG. 11 is a flowchart showing a sorting process of allocatable drives. The present processing is performed to extract drives satisfying the capacity being allocated to the RG.

In S1101, the CPU 303 enters "1" to M as an initial value of drive #M.

In S1102, the CPU 303 determines whether the free capacity 613 of the drive #M exceeds a capacity 503 required per drive, that is, whether it exceeds Cmax/Nmax (=Dave) or not. If it does not exceed the capacity 503, the CPU 303 executes S1106, and if it exceeds the capacity 503, the CPU 303 executes S1103.

In S1103, the CPU 303 determines whether the number of parities to be added to the new RG is "2" or not. If the number is not "2" (No), the CPU 303 executes S1108, and if the number is "2" (Yes), the CPU 303 executes S1104. The CPU 303 executes S1108 if the emulation type 511 in the RG configuration management table 50 is "2D2D" or "7D1P". The CPU 303 executes S1104 if the emulation type 511 is "6D2P".

In S1104, the CPU 303 determines whether the free capacity 613 of drive #M exceeds double the value of Cmax/Nmax (=Dave). If not exceeded (No), the CPU 303 executes S1108 since it is not possible to ensure a capacity corresponding to two drives, and if exceeded (Yes), the CPU 303 executes S1105 since a capacity corresponding to two drives can be ensured.

In S1105, the CPU 303 enters drive #M as the allocatable drives and two drives worth of drives are entered to the allocatable drive management table 70. In other words, as according to case 2 of FIG. 1(2), the drive can be divided into two PDEVs and each PDEV can be handled as a single drive to constitute a single RG, so that drive #M is entered as two drives in the allocatable drive management table 70.

In S1106, the CPU 303 adds 1 to M to execute the processes from S1102 in the drive having the next number.

In S1107, the CPU 303 determines whether the number of drives entered in the drive management table 60 is equal to M or smaller. If the number is smaller (Yes), the CPU 303 executes the process of S1102 since a drive having the next number exists, and if the number exceeds M (No), it means that the sorting process has been completed in all the drives, so that the process is returned to S911.

In S1108, the CPU 303 enters a single drive worth of drive #M as the allocatable drive to the allocatable drive management table 70. In other words, as according to case 3 of FIG. 1 (3), the drive is divided into two PDEVs, and drive #M is entered as a single drive in the allocatable drive management table 70 to enable each PDEV to be used in different RGs.

<Automatic Drive Allocation Processing>

FIG. 12 is a flowchart showing the automatic drive allocation processing. The automatic drive allocation processing is a process for automatically determining the drive being allocated based on the contents of the priority order management table 80. The descriptions of processes from S1201 to S1208 are omitted, since they are the same as processes S1101 to S1108.

In S1209, the CPU 303 determines Nmax−N number of drives to be allocated automatically from the drives entered in the allocatable drive management table 70 based on the priority order 801 specified by the user through the host computer 40 and received by the storage subsystem 3. Then, the CPU 303 returns the process to S921 and executes S922.

As described, the RG can be composed by combining different types of drives. Further, a single drive can be divided into two or more PDEVs, and one of the divided PDEVs can be used together with other drives to constitute a single RG. Furthermore, two or more RGs can be composed by using each of the PDEVs having been divided into two or more PDEVs.

As described, according to the storage subsystem of the present invention, the response performance to the RG can be controlled in a stepwise manner according to the ratio of the respective types of drives configuring the RG, and the costs can also be adjusted in a stepwise manner. Therefore, a storage subsystem satisfying the specifications required by the user can be provided at a low cost. Further, since the drive having an excessive performance or excessive capacity can be used in other RGs, physical resources of the storage subsystem can be effectively utilized according to the present invention. In the present example, a combination of SSD and SAS-HDD is described, but naturally, the RG can be composed of a combination of SSD and SATA-HDD, a combination of SAS-HDD and SATA-HDD, or a combination of three or more types of drives such as SSD, SAS-HDD and SATA-HDD.

Embodiment 2

<Concept of the Invention>

Figure 13:
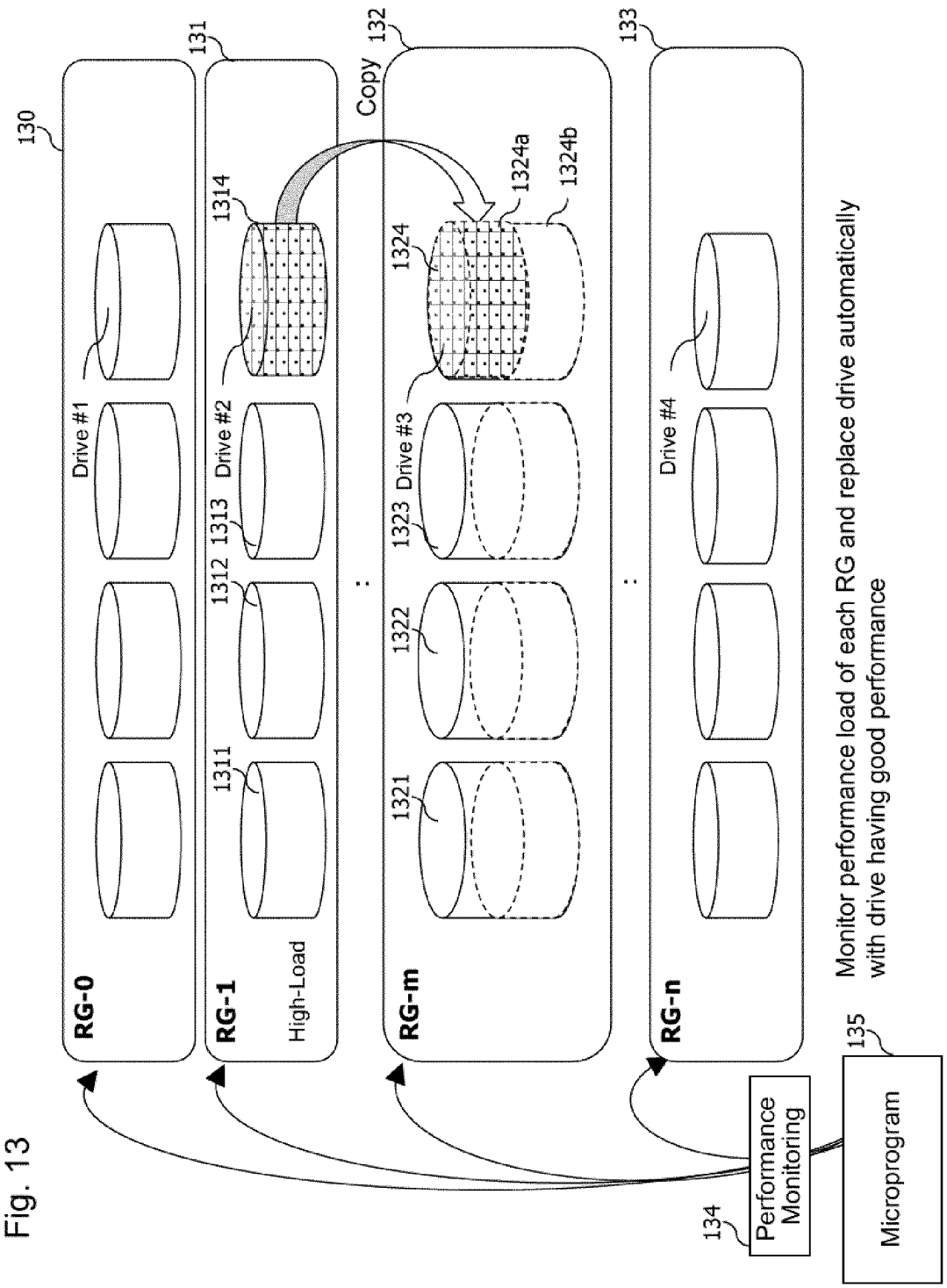
FIG. 13 is a view showing a second concept of the present invention.
Figure 14:
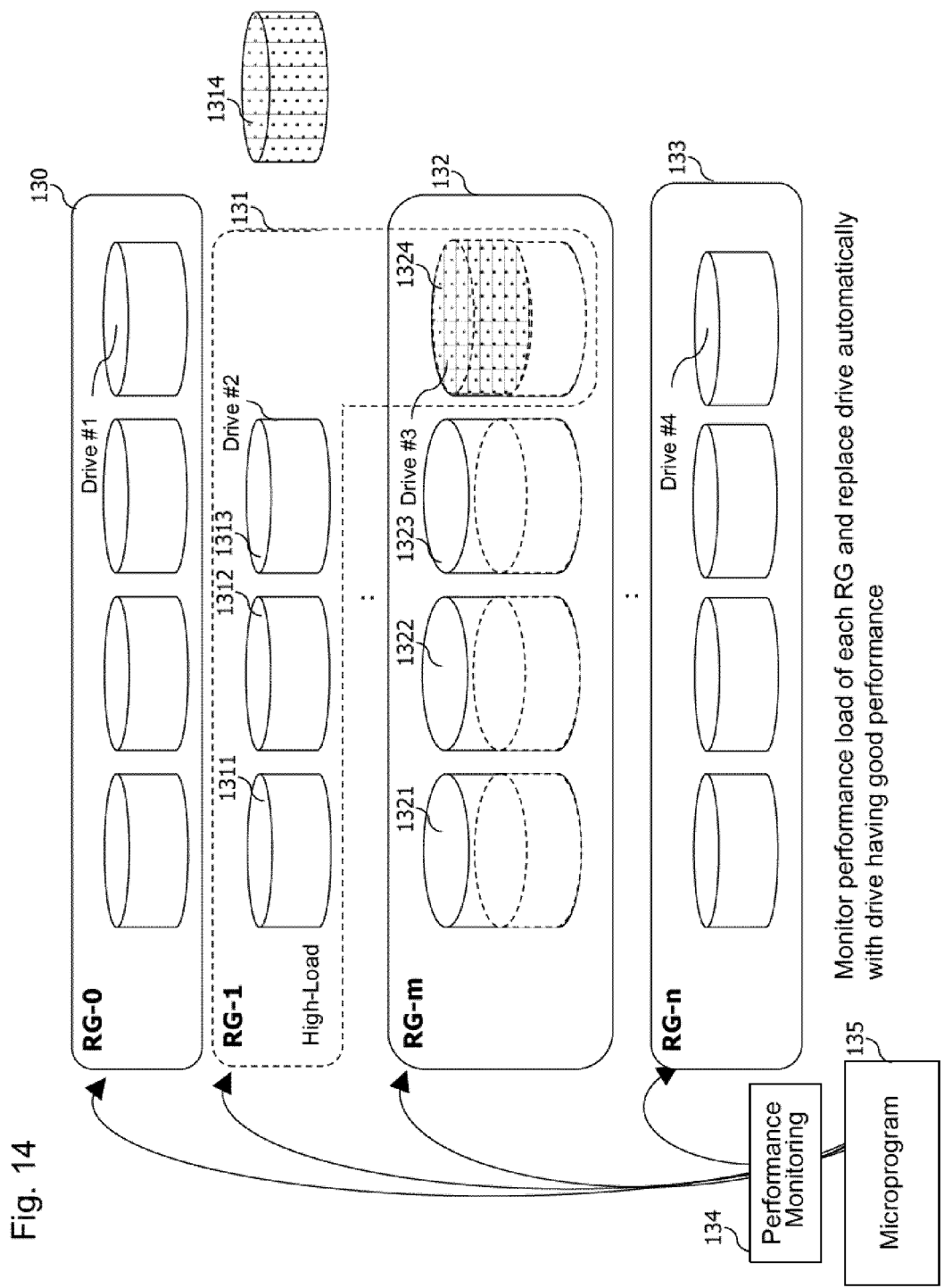
FIG. 14 is a view showing a second concept of the present invention.

FIGS. 13 and 14 are views showing a second concept of the present invention. We will describe a case where the RG configuration is changed according to the status of load of the RG, which is the concept of the second embodiment of the present invention, with reference to FIGS. 13 and 14.

A performance monitoring function 134 of a microprogram (system control program) 135 operating in the CPU 303 monitors the status of load of each RG (from RG-0 130 to RG-n 133), and detects the RG in a high-load status or an overloaded status (which is RG-1 131 in the present example). Next, the performance monitoring function 134 detects a drive having the lowest performance out of the drives #2 1311 to 1314 constituting the detected RG-1 131 (which is drive #2 1314 in the present example).

The data of the detected drive #2 1314 is copied to a drive having higher performance (such as SSD), which in the present example is the PDEV 1324a having divided drive #3 1324 of RG-m 132. After completing the copying process, as shown in FIG. 14, the RG-1 131 having been composed of drive #2 1311 to 1314 is changed to the RG configuration composed of drive #2 1311 to 1313 and drive #3 1324. Even after the change of RG configuration have been completed, the allocated capacity to drive #2 1314 being the copy source is not freed. This is to return the RG configuration to the original RG configuration when the load has transited to a steady state.

As described, when the RG enters a high-load status, the RG configuration is changed by replacing the drive having a low performance with the drive having a high performance, thereby improving the performance of the whole RG as described in FIG. 2.

<Table>
<Priority Order Management Table 2>

Figure 15:
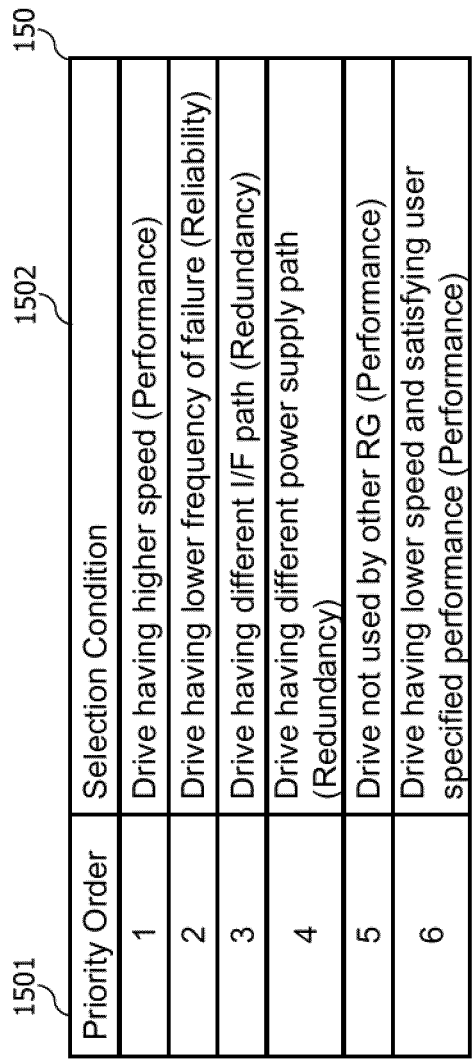
FIG. 15 is a view showing a second configuration example of the priority order management table.

FIG. 15 is a view showing a second configuration example of a priority order management table. A priority order management table 150 is a table for managing the priority conditions for allocating the allocatable drives to the RG, similar to the priority order management table 80 of FIG. 8. The difference between table 150 and table 80 is that according to embodiment 1, the drive to be allocated is selected, so that the selection condition "7" in the priority order 801 stating that "a single physical drive can be allocated as multiple drives to a single RG (case 2)" does not exist in the priority order management table 150 of FIG. 15.

<RG Status Management Table>

FIGS. 16 and 17 are views showing a configuration example of an RG status management table. The configuration of the RG status management table 160 has integrated the aforementioned RG configuration management table 50 and the drive management table 60, and further added thereto a low load threshold (RG performance×0.5) (IOPS) 1601, a high load threshold (RG maximum performance× 0.8) (IOPS) 1602, a measured value of RG load (IOPS) 1603, a copy source information 1604, and an allocation start location 1605.

The measured value of RG load 1603 of RG1 (having RG #501 set to "1") is increased from 150 to 800 (IOPS), and exceeds the high load threshold 1602. Thus, performance deterioration occurs in which the response time from the storage subsystem 3 or the processing time increases. Thus, a portion or a whole of the drives constituting the RG are replaced with high performance drives to increase the RG allocated performance 615 so that it exceeds the measured value of RG load 1603, and the performance can thereby be improved.

At first, the drive having the smallest allocated performance is selected from the drives of RG1, but in the present example, the allocated performances of drives A1 through A4 constituting the RG are the same, so that for example, based on "2" in the priority order 1501 stating a selection condition of "drive having low frequency of failure occurrence (reliability)" in the priority order management table 150, drive A4 is determined as the drive to be replaced (hereinafter referred to as copy source drive).

Thereafter, the drive having a free capacity 613 greater than the allocated capacity 612 of the drive of RG1 and also having a free performance 616 greater than the allocated performance 615 of the drive of RG1 is determined as a drive candidate to be replaced (hereinafter referred to as copy destination drive candidate). In the present example, drives B1 through B4 of RG2 are determined as copy destination drive candidates. These drives satisfy the condition of "1" in the priority order 1501 stating a "drive having higher speed (performance)" in the priority order management table 150.

Next, based on the selection condition of "drive having lower frequency of failure" having a priority order 1501 of "2", drive B1 is determined as the copy destination drive, which is combined with other information such as the copy source drive or the allocation start location information in the drive (start logical block address), and stored in the RG status management table 160.

Lastly, the data in copy source drive A4 is copied to copy destination drive B1, and an RG is composed of drives A1 through A3 and B1. Thereby, the high load threshold 1602 can be increased from 533 to 25400 IOPS, and the measured value of RG load 1603 becomes lower than the high load threshold 1602, so that the deterioration of performance can be solved. Similarly, when the measured value of RG load 1603 is significantly increased from 800 to 30000, data can be copied from drive A3 as the copy source drive to drive B2 as the copy destination drive, and the RG configuration is changed to improve the RG performance.

In contrast, if the measured value of RG load 1603 is reduced from 30000 to 180 IOPS which is below the low load threshold 1601, copy-back of data from drive B2 to drive A3 and from drive B1 to drive A4 is executed to return the configuration to the original RG configuration.

As described, by replacing the drives constituting the RG according to the fluctuation of load in the RG, deterioration of performance of the storage subsystem 3 can be prevented automatically. The actual operation of this example will be described with reference to FIG. 18.

<RG Configuration Change Processing>

Figure 18:
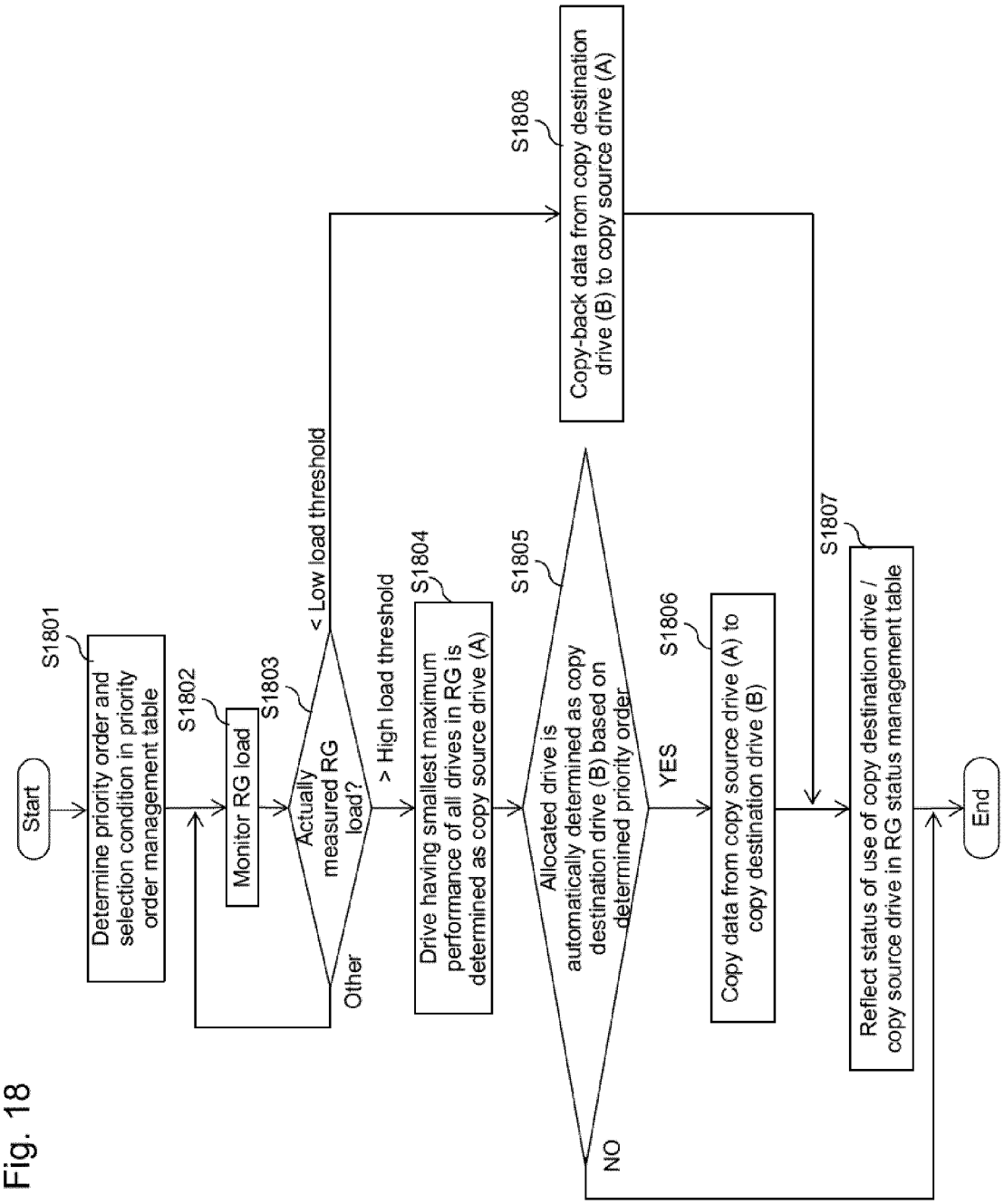
FIG. 18 is a flowchart showing an RG configuration change processing.

FIG. 18 is a flowchart showing an RG configuration change processing. The present processing can be executed by the CPU 303 either periodically via a scheduler or the like or constantly.

The user determines the priority order and the selection condition in the priority order management table and enters the determined contents through the host computer 40, wherein the entered priority order and the selection condition is received by the CPU 303 of the storage subsystem 3 (S1801).

In S1802, the CPU 303 monitors the status of load of the respective RGs. That is, as mentioned earlier, the performance monitoring function 134 of the microprogram 135 operating in the CPU 303 monitors the actual RG load, and stores the result in the measured value of RG load 1603 of the RG status management table 160.

In S1803, the CPU 303 determines whether the actually measured RG load has exceeded the high load threshold 1602, or whether it is smaller than the low load threshold 1601, or whether it falls within the range between the low load threshold 1601 and the high load threshold 1602. If the load has exceeded the high load threshold 1602 (>high load threshold), the CPU 303 executes S1804, and if the load is smaller than the low load threshold 1601 (<low load threshold), the CPU 303 executes S1808. In other cases, the CPU 303 re-executes the actual measurement of RG load in S1802.

In S1804, the CPU 303 determines the drive having the smallest maximum performance out of all drives in the RG as the copy source drive (A). For example, as mentioned earlier, drive A4 is set as the copy source drive (A).

In S1805, the CPU 303 determines whether the allocated drive, that is, the copy destination drive (B), is to be determined automatically based on the priority order determined in S1801. If the drive is to be determined automatically (Yes), the CPU executes S1806. In this case, for example, drive B1 is set as the copy destination drive (B), as mentioned earlier. If the drive is not to be determined automatically (No), the process is ended.

In S1806, the CPU 303 performs data copy from copy source drive (A) to copy destination drive (B).

In S1807, the CPU 303 reflects the status of use of the copy destination drive and the copy source drive in the RG status management table 160.

If the actually measured RG load is smaller than the low load threshold 1601 (<low load threshold), the CPU 303 performs copy-back of data from the copy destination drive (B) to the copy source drive (A) in S1808. Then, in S1807, the CPU 303 reflects the status of use of the copy destination drive and the copy source drive in the RG status management table 160, and ends the process.

As described, according to embodiment 2, the drives constituting an RG can be changed automatically according to the fluctuation of RG load, to thereby prevent deterioration of performance of the storage subsystem 3.

As described, according to the present invention, the RG can be composed of a mixture of different types of drives. Further, a single drive can be divided into two or more PDEVS, and one of the divided PDEVs can be used together with other drives to constitute a single RG. Furthermore, PDEVs divided into two or more drives can be used respectively to constitute two or more RGs.

Further, the drives constituting the RG can be changed automatically according to the fluctuation of RG load. Thereby, according to the storage subsystem of the present invention, the response performance with respect to the RG can be controlled in a stepwise manner according to the ratio of the respective types of storage drives constituting the RG, and the cost thereof can also be adjusted in a stepwise manner. Therefore, a storage subsystem capable of satisfying the specifications requested by the user can be provided at a low cost. Furthermore, since the storage drive having excessive performance or excessive capacity can be used in other RGs, the physical resources of the storage subsystem can be utilized effectively.

Moreover, the drives constituting the RG can be selected not only based on performance but also based on reliability related to redundancy of interface paths coupled to the drives or power supply paths for supplying power thereto or indexes such as failure frequency, so that a storage subsystem having high redundancy and high reliability can be constructed.

The present invention is not restricted to the above-illustrated preferred embodiments, and can include various modifications. The above-illustrated embodiments are mere examples for illustrating the present invention in detail, and they are not intended to restrict the present invention to include all the components illustrated above. Further, a portion of the configuration of an embodiment can be replaced with the configuration of another embodiment, or the configuration of a certain embodiment can be added to the configuration of another embodiment. Moreover, a portion of the configuration of each embodiment can be added to, deleted from or replaced with other configurations.

A portion or whole of the above-illustrated configurations, functions, processing units, processing means and so on can be realized via hardware configuration such as by designing an integrated circuit. Further, the configurations and functions illustrated above can be realized via software by the processor interpreting and executing programs realizing the respective functions.

The information such as the programs, tables and files for realizing the respective functions can be stored in a storage device such as a memory, a hard disk or an SSD (Solid State Drive), or in a memory media such as an IC card, an SD card or a DVD.

Only the control lines and information lines considered necessary for description are illustrated in the drawings, and not necessarily all the control lines and information lines required for production are illustrated. In actual application, it can be considered that almost all the components are mutually coupled.

REFERENCE SIGNS LIST

3 Storage subsystem
10 Drive #1

11 Drive #2a
12 Drive #2b
13 Drive #2c
14 Drive #3
30 Controller unit
31 Drive unit
32 Drive canister
40 Host computer
41 Maintenance terminal
42 LAN
50 RG configuration management table
60 Drive management table
70 Allocatable drive management table
80, 150 Priority order management table
160, 170 RG status management table
300a, 300b MPPK
303 CPU
311, 312, 313 RAID group
314 SAS-HDD
315 SSD

The invention claimed is:

1. A storage subsystem coupled to a host computer, the storage subsystem comprising:
   a first storage drive storing data from the host computer;
   a second storage drive having a different storage capacity and different access performance than the first storage drive and storing data from the host computer; and
   a processor configured to control the first storage drive and the second storage drive; wherein
   the storage subsystem receives a RAID group configuration requirement including a minimum access performance of a RAID group from the host computer;
   the processor determines whether a RAID group satisfying the RAID group configuration requirement can be configured, and responsive to a determination that the RAID group can be configured, the first storage drive and the second storage drive are used in a mixture to configure a first RAID group; and
   when an access load to the first RAID group becomes equal to or greater than a maximum load threshold calculated from a maximum access performance of the first RAID group, a storage drive configuring the first RAID group is replaced so that the maximum access load threshold exceeds the access load.

2. The storage subsystem according to claim 1, wherein when an access load to the first RAID group becomes equal to smaller than a minimum load threshold determined based on the minimum access performance of the first RAID group, a configuration of the first RAID group is returned to a state prior to replacing the storage drive.

* * * * *